Patented Sept. 2, 1947

2,426,854

UNITED STATES PATENT OFFICE 2,426,854

POLYMERIZATION OF CHLOROPRENE

Paul O. Bare, Wilmington, Del., assignor to E. I. du Pont de Nemours & Company, Wilmington, Del., a corporation of Delaware No Drawing. Application December 15, 1945, Serial No. 635,419

2 Claims. (Cl. 260—92.7)

This invention relates to the polymerization of chloroprene and more particularly to an improved method for regulating and accelerating emulsion polymerization of chloroprene (2-chloro-butadiene-1,3) either alone or in mixtures with other polymerizable compounds.

It is known that polymerization reactions may be initiated and accelerated by the use of heat, light and pressure and by the presence of various substances, among which are oxygen-yielding compounds such as inorganic peroxides, organic peroxides and salts of acid peroxides. However, with the use of such well known polymerization initiators or catalysts, considerable difficulty is still experienced in obtaining high yields of desirable polymers in short intervals of time. In the commercial manufacture of polymers by emulsion polymerization, the production schedule is frequently disrupted by slow reactions, caused by variations in the response of the polymerizable compounds to the action of the catalyst, by long induction periods before the polymerization starts, and, sometimes, by erratic, exceedingly fast reactions which proceed so rapidly in the early stages that it is difficult to remove the heat generated and which, on the other hand, sometimes become so slow toward the end that it is impractical to extend the time required in order to attain a high yield of polymer.

It is therefore an object of this invention to provide means for catalyzing the polymerization of chloroprene either alone or in mixtures with other polymerizables. A further object is to provide a new method for accelerating the polymerization which is cheap to operate and which may be used in conjunction with previously known methods to secure a still greater increase in the rate of polymerization and increased yield of polymer, yet one which gives a smooth and uniform rate of polymerization which carries throughout the polymerization. A still further object is to provide a method of accelerating the polymerization of the chloroprene, either alone or in mixtures with other polymerizables, while dispersed in an aqueous medium. Other objects will appear hereinafter.

I have found that the polymerization of chloroprene, when carried out in the usual aqueous emulsion by means of catalysts such as the salts of the acid peroxides, can be materially accelerated and carried more nearly to completion in a reasonable length of time if there is added to the emulsion polymerization an anthraquinone sulfonic acid or water soluble salt thereof, and more particularly the alkali metal salt of anthraquinone beta-sulfonic acid (silver salt).

The following examples are given to illustrate the invention. The parts used are by weight.

Example 1

One hundred (100) parts of chloroprene, containing 0.6 part of sulfur and 4 parts of Nancy Wood rosin in solution, was emulsified in 156 parts of water containing 0.32 part of sodium hydroxide, 0.6 part of potassium persulfate and 0.5 part of the sodium salts of the dinaphthylmethane sulfonic acids prepared, for example, according to U. S. Patent No. 1,336,759 from naphthalene, formaldehyde and sulfuric acid. The temperature of the emulsion rose to 35° C. as a result of polymerization, and was maintained at this point by gently agitating the emulsion by mechanical means throughout the polymerization and by external cooling of the vessel in which the polymerization was carried out. In 298 minutes, 94% of the chloroprene had polymerized, as determined from the specific gravity of the emulsion. In a parallel run, 0.005% of anthraquinone beta-sodium sulfonate was added to the emulsion as a 1% aqueous solution when the chloroprene was 73% polymerized. At the end of only 210 minutes, 94% of the chloroprene was polymerized. In another parallel run, the potassium persulfate was left out of the emulsion at the start and only 135 parts of water were used in preparing the emulsion. To catalyze the polymerization, there was continuously added to the dispersion, dropwise, throughout the polymerization, 22 parts of an aqueous solution containing 2% of potassium persulfate and 0.1% of anthraquinone beta-sodium sulfonate. After 83 minutes, 94% of the chloroprene was polymerized.

Example 2

One hundred (100) parts of chloroprene and 69.5 parts of isoprene were emulsified in 218 parts of water containing 16.8 parts of the sodium salt of sulfated technical oleyl acetate, 8 parts of acetic acid, 0.85 part of potassium persulfate and 0.032 part of anthraquinone beta-sodium sulfonate. The polymerization was carried out in an open vessel. The temperature was maintained at 35° C. throughout the polymerization by gently mechanically agitating the emulsion and by externally cooling the vessel in which the polymerization was carried out. After 90 minutes, 77.2% of the monomers had polymerized. In a parallel run in which the anthraquinone beta-sodium sulfonate was omitted, only 68.8% of the monomers had polymerized in 280 minutes.

*Example 3*

One hundred (100) parts of chloroprene containing 0.25 part of sulfur and 4 parts of a disproportionated rosin (Hercules Resin 731) were emulsified in 94.8 parts of water containing 1.12 parts of sodium hydroxide and 0.03 part of potassium persulfate. The temperature of the emulsion was allowed to rise to 40° C. and was maintained at this temperature throughout the polymerization by mechanically agitating the emulsion and applying external cooling to the walls of the polymerizing vessel. When 40% of the chloroprene had polymerized, as measured by the specific gravity of the emulsion, the first of five equal parts of a catalyst solution containing 4.82 parts of water, 0.175 part of potassium persulfate and 0.0075 part of anthraquinone beta-soduim sulfonate was added to the emulsion. The remaining parts of the catalyst solution were added to the emulsion as required to maintain the desired rate of polymerization. After 5.5 hours, the polymerization was finished and 1 part of diethanolamine was added to the latex as a stabilizer. The total dry solid content of the latex was then 50.5%. In a parallel run where 0.25 part of potassium persulfate was incorporated into the freshly made up emulsion and a total of 0.25 part of potassium ferricyanide together with 0.025 part of potassium persulfate in water solution were added to the emulsion, stepwise, as needed, the emulsion after stabilization with 1.0 part of diethanolamine, added as a 40% solution, had a total dry solid content of only 49% after 6 hours of polymerization.

*Example 4*

One hundred (100) parts of chloroprene, containing 0.3 part of dodecyl mercaptan and 4 parts of a disproportionated rosin (Hercules Resin 731), were emulsified in 147 parts of water containing 0.82 part of sodium hydroxide and 0.6 part of the sodium salts of the dinaphthylmethane sulfonic acids prepared according to U. S. Patent No. 1,336,759. The temperature of the emulsion rose to 10° C. as a result of polymerization and was maintained at this temperature by mechanically agitating the emulsion and by externally cooling the vessel in which the polymerization was carried out. As soon as the emulsion temperature reached 10° C., there was added to the emulsion in 12 equal portions, stepwise, as needed in order to maintain a satisfactory rate of polymerization, a total of 0.36 part of potassium persulfate and 0.036 part of anthraquinone beta-sodium sulfonate contained in 14 parts of water. After 260 minutes, a polymer yield of 65% had been attained. In a similar run, where a solution containing only potassium persulfate was added stepwise to the emulsion, only 25% of the monomer had polymerized after 260 minutes, during which time 0.73 part of potassium persulfate contained in 28.5 parts of water were added.

The disproportionated rosin, identified in the above examples as Hercules Resin 731, is a pine wood rosin derivative having a melting point of approximately 350° F., an acid number of 158–165, a saponification number of 180, a specific rotation of +60 to +63, and which contains 9% of unsaponifiable material. It has an abietic acid content of less than 0.5% and a dehydro abietic acid content of less than 54%, and a retene content of 0.1% to 0.3%. This material is a product of commerce, which was bought on the open market under the designation of Hercules Resin 731. The Nancy Wood rosin, used in Example 1, is a pine wood rosin having a melting point of 181° F., an acid number of 165, a saponification number of 172, and a specific rotation (solid) of +10 to +11. It contained approximately 6% of unsaponifiable material. Any wood rosin, as more particularly disclosed in the prior art, may be employed in carrying out the emulsion polymerization exemplified by the above examples.

Except for the addition of the anthraquinone sulfonic acid or alkali metal salt thereof, the emulsion polymerization of the chloroprene, or mixtures of chloroprene with copolymerizable materials, may be carried out by any of the well known methods for effecting emulsion polymerization of such materials in which the polymerization is catalyzed by the use of the salts of acid peroxides such as perborate, percarbonate, or, preferably, a persulfate. The resulting polymerized emulsions containing polymer particles dispersed in a liquid medium resemble natural rubber latex and may be coagulated in the usual manner to yield solid polymer, or may be used in the emulsion form similar to those uses for which natural rubber latex is used. In all cases, the products prepared through the use of anthraquinone beta-sodium sulfonate as catalyst activator have been found to be equal to or superior to those made without its use. In Example 3 where the product was prepared to be used in the form of a liquid latex, a definite improvement in the stability of the latex resulted through the use of anthraquinone beta-sodium sulfonate as catalyst activator.

Other anthraquinone sulfonic acids or alkali metal salts of anthraquinone sulfonic acids may be substituted for the anthraquinone beta-sulfonic acid in the above examples. As examples of the other types of anthraquinone sulfonic acid compounds may be mentioned anthraquinone alpha-sodium sulfonate, anthraquinone 2,6-disodium sulfonate and anthraquinone 1,5-disodium sulfonate. These anthraquinone sulfonic acid compounds may be used as the free acids or as the water soluble alkali metal or ammonia salts thereof. The use of the alkali metal salts of the anthraquinone sulfonic acids is preferred because of their greater solubility in water solutions.

The amount of the anthraquinone sulfonic acid or alkali metal salt used as activator may be varied over rather wide limits. For most purposes less than 2% by weight, based on the weight of the monomers, is employed, and in most instances the polymerization proceeds most rapidly when from 0.001% to 0.1% is used, although smaller quantities have definite effect and larger quantities are desirable in some instances.

Any of the water soluble salts of acid peroxides (peracids), such as ammonium persulfate, sodium percarbonate and sodium perborate, may be used effectively as catalysts in place of the potassium persulfate used in the examples. The amount of the water soluble salts of the acid peroxides so used as catalyst may be varied over rather wide limits. For most purposes, small amounts of the order of less than 2% by weight, based on the weight of the monomers, is employed, the preferred concentration being between 0.01% and 0.75%. The use of such small amounts is made possible by an apparent more effective use of the catalyst in the presence of the anthraquinone sulfonic acid. Very small amounts of persalts and anthraquinone sulfonates are particularly effective when disproportionated rosin is used to form the emulsifying agent, as in Example 3.

As has been mentioned above, the present invention is applicable to the polymerization of chloroprene either alone or in mixtures with one or more other polymerizable compounds, many of which, in many cases, enter into chemical combination with the chloroprene. Examples of these compounds are butadiene-1,3, isoprene, acrylic nitrile, methyl vinyl ketone, vinylidene chloride, acrylic and methacrylic esters, dialkyl vinylethynyl carbinols, styrene and similar compounds which themselves yield rubber-like copolymers. This invention is particularly applicable to the polymerization of chloroprene (2-chlorobutadiene-1,3) or to those copolymers which contain the chloroprene in the preponderant amount, that is, in which at least 50% of the total polymerizable material is chloroprene.

The anthraquinone sulfonic acid, together with a water soluble salt of an acid peroxide, may be employed to catalyze the polymerization of monomers in aqueous emulsions in which any one of a wide variety of emulsifying agents is employed in producing the emulsion. Naturally, those giving fine and permanent dispersions are preferred. The medium in which the polymerization takes place may be either acid or alkaline. It will therefore be necessary to use as the emulsifying agent one which is effective at the pH at which the polymerization is to be carried out. Examples of these emulsifying agents are given in U. S. Patent 2,264,173 beginning on page 4, column 2, line 44 and ending on page 5, column 2, line 41 of the same patent. The present invention is applicable in those processes where any of a large variety of modifying agents are used, such as sulfur, illustrated by Examples 1 and 3, and mercaptans, illustrated in Example 4. The process is equally applicable when no modifying agent is present, as in Example 2. Other modifying agents disclosed in the prior art may also be used, such as hydrogen sulfide, sulfur dioxide, quinones and sulfinic acids.

The polymerization may be carried out at temperatures ranging from about 0° C. to about 100° C., although temperatures between about 10° C. and 60° C. are preferred. Because of the much more rapid polymerization obtained by the process of the present invention, it is possible to operate at a considerably lower temperature and still carry out the polymerization in the same time as required by previous methods.

It is apparent that many widely different embodiments of this invention may be made without departing from the spirit and scope thereof, and, therefore, it is not intended to be limited except as indicated in the appended claims.

I claim:

1. The process which comprises polymerizing chloroprene in an aqueous emulsion in the presence of a water soluble salt of an acid peroxide and a compound of the class consisting of sulfonic acids of anthraquinone and their water soluble salts.

2. The process which comprises polymerizing chloroprene in an aqueous emulsion in the presence of a water soluble salt of an acid peroxide and a water soluble salt of anthraquinone beta-sulfonic acid.

PAUL O. BARE.